United States Patent
Cheung et al.

(10) Patent No.: US 8,468,076 B2
(45) Date of Patent: Jun. 18, 2013

(54) CHARGE CONTROL SYSTEM AND METHOD

(75) Inventors: Ho-Leung Cheung, Santa Clara, CA (US); Jia-Lin Chen, New Taipei (TW); Chun-Wen Wang, New Taipei (TW); Chia-Hung Chien, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/340,648

(22) Filed: Dec. 29, 2011

(65) Prior Publication Data

US 2013/0132272 A1 May 23, 2013

(30) Foreign Application Priority Data

Nov. 17, 2011 (TW) ............................... 100142038 A

(51) Int. Cl.
*G06Q 40/00* (2012.01)
(52) U.S. Cl.
USPC ............................................................ 705/35
(58) Field of Classification Search
USPC ............................................................. 705/35
See application file for complete search history.

(56) References Cited

U.S. PATENT DOCUMENTS

| | | | | |
|---|---|---|---|---|
| 2001/0001856 A1* | 5/2001 | Gould et al. | ..... | 705/39 |
| 2002/0138438 A1* | 9/2002 | Bardwell | ..... | 705/51 |
| 2003/0055792 A1* | 3/2003 | Kinoshita et al. | ..... | 705/67 |
| 2003/0200184 A1* | 10/2003 | Dominguez et al. | ..... | 705/78 |
| 2011/0301748 A1* | 12/2011 | Lecarpentier | ..... | 700/232 |

OTHER PUBLICATIONS

Lida, Jeanne; "After series of false starts, debit cards show promise"; Aug. 19, 1992; ISSN: 0002-7561.*
PR_Newswire, "Fastest Recharging Stations Introduced for Conferences and Events." Apr. 15, 2011; Conference news; Newswire.*
PR_Newswire_2, "Charge 2 Go, Inc. Wins 2007 CES Award for Power Station"; Nov. 9, 2006; Newswire.*

* cited by examiner

*Primary Examiner* — Edward Chang
(74) *Attorney, Agent, or Firm* — Altis Law Group, Inc.

(57) ABSTRACT

A charge control system which is applied in a hardware environment includes an electronic device, an intelligent ammeter, and a server. The intelligent ammeter is connected to the server by a network connection. The charge control system includes a storage unit, and at least one processor. The storage unit stores a plurality of validation information. The at least one processor includes a receiving module, a validating module and a charge control module. The receiving module receives information from a user intended to validate the user. The validating module determines whether the received information matches one of the items of predetermined validation information. The charge control module controls the intelligent ammeter to begin charging the electronic device when the received information matches one of items of the predetermined validation information.

4 Claims, 3 Drawing Sheets

CHARGE CONTROL SYSTEM AND METHOD

BACKGROUND

1. Technical Field

The present disclosure relates to control systems and, particularly, to a charge control system and a charge control method.

2. Description of Related Art

Electronic devices, such as mobile phones, may run out of power when the user is away from his own house or office. The user needs to find a power outlet to charge the electronic device if he does not possess a replacement battery for the electronic device. However, it is difficult for the user to calculate how much money should be paid for a provider who demands money for providing the socket.

Therefore, what is needed is a charge control system and a method to overcome the described limitations.

DETAILED DESCRIPTION

Figure 1:
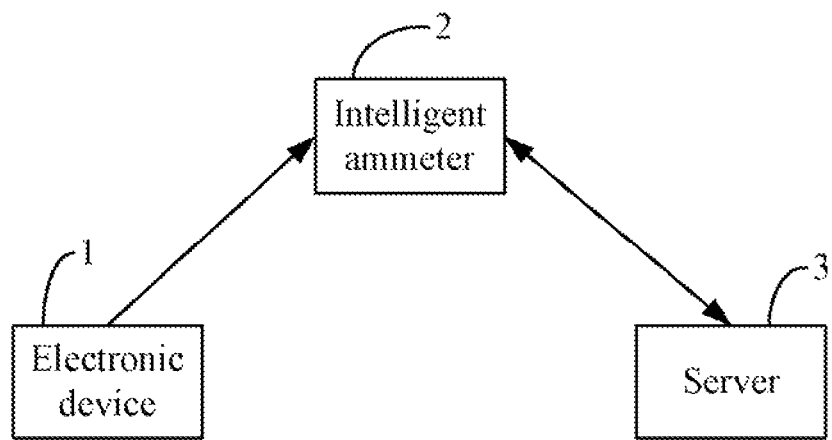
FIG. 1 is a schematic diagram of a charge control system, including an electronic device, an intelligent ammeter and a server, in accordance with an exemplary embodiment.

FIG. 1 shows a charge control system 10 which is applied in a hardware environment which includes an electronic device 1, an intelligent ammeter 2, and a server 3. The intelligent ammeter 2 is connected to the server 3 by a network connection. The electronic device 1 may be a mobile phone, a tablet personal computer, or the like.

Figure 2:
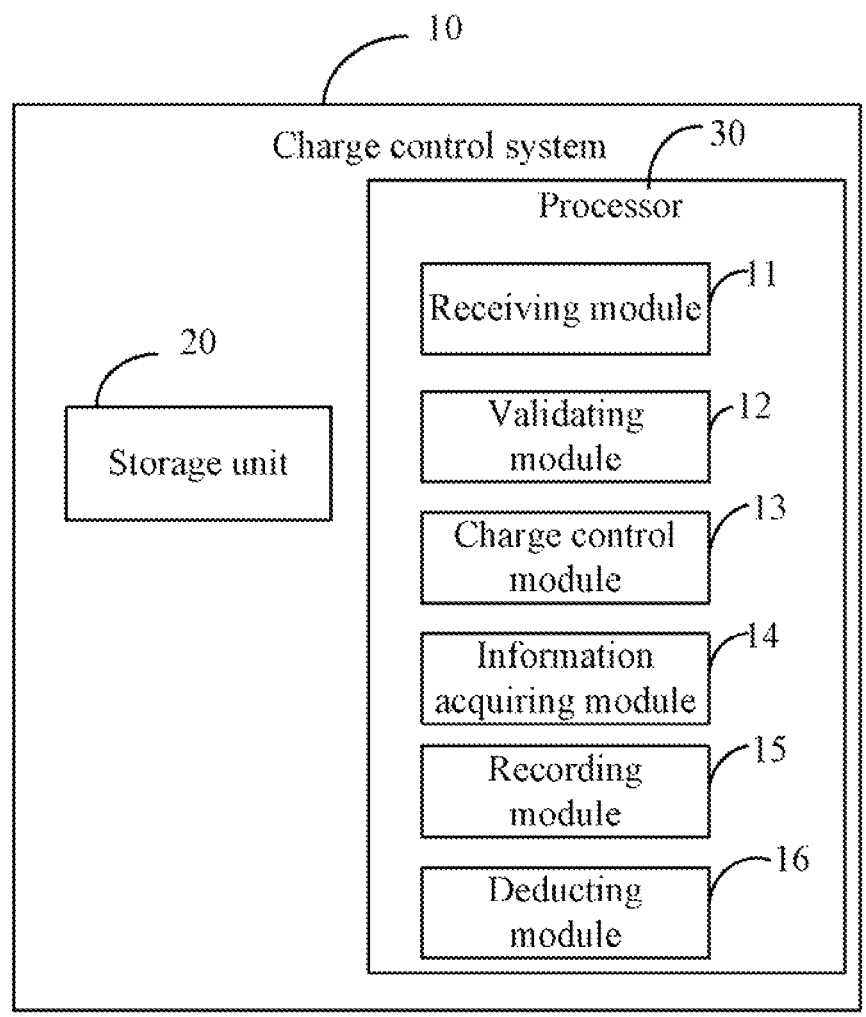
FIG. 2 is a block diagram of the hardware infrastructure of the charge control system of FIG. 1, in accordance with an exemplary embodiment.

Referring to FIG. 2, the charge control system 10 includes at least one processor 30 and a storage unit 20. The storage unit 20 is configured to store a number of items of predetermined validation information of the user of the electronic device 1. In one embodiment, an item of predetermined validation information may incorporate the fingerprint of a user, for example, another item may include an image of the user's eye, another item may be the sound of a user's voice, and another item may incorporate a combination of the foregoing, or other identifying characteristic(s).

The least one processor 30 includes a receiving module 11, a validating module 12, and a charge control module 13.

The receiving module 11 receives the validation information from the electronic device of the user. The validating module 12 determines whether the received validation information is one of the items of predetermined validation information stored in the storage unit 20. The charge control module 13 controls the intelligent ammeter 2 to charge the electronic device 1 when the received validation information matches one of the items of predetermined validation information stored in the storage unit 20.

In a first embodiment, the receiving module 11 and the validating module 12 are incorporated into the intelligent ammeter 2, the validation information is stored in the server 3, and the charge control module 13 is incorporated into the server 3. For example, when the user enters a restaurant and the electronic device 1 is without power, the user can connect the electronic device 1 to the intelligent ammeter 2. Then, the intelligent ammeter 2 prompts the user to input his validation information, the receiving module 11 receives the input validation information, and the validating module 12 determines whether the received validation information matches one of the items of predetermined validation information stored in the server 3. If there is a match, the charge control module 13 charges the electronic device 1. In other embodiments, the receiving module 11, the validation module 12 and the charge control module 13 can be incorporated into the server 3.

The storage unit 20 further stores a number of payment accounts. Each of the payment accounts is associated with one of the items of the predetermined validation information stored in the storage unit 20. The least one processor 30 further includes an information acquiring module 14. The information acquiring module 14 is configured to acquire the payment account which is associated with the item of validation information, and detect whether there is enough money in the payment account for charging the electronic device 1 when the received validation information matches one of the items of predetermined validation information stored in the storage unit 20. The charge control module 13 controls the intelligent ammeter 2 to begin charging the electronic device 1 when there is at least a predetermined amount of money in the payment account.

The least one processor 30 further includes a recording module 15 and a deducting module 16. The recording module 15 is configured to record the total amount of electrical power (charging value) provided by the intelligent ammeter 2 to the electronic device 1 during a charging procedure. The receiving module 11 is further configured to receive a charging completed instruction. The charge control module 13 is further configured to control the intelligent ammeter 2 to stop charging the electronic device 1 in response to received charging completed instruction. The deducting module 16 is configured to calculate a payment charge according to the charging value, and deduct the calculated payment charge from the payment account.

Figure 3:
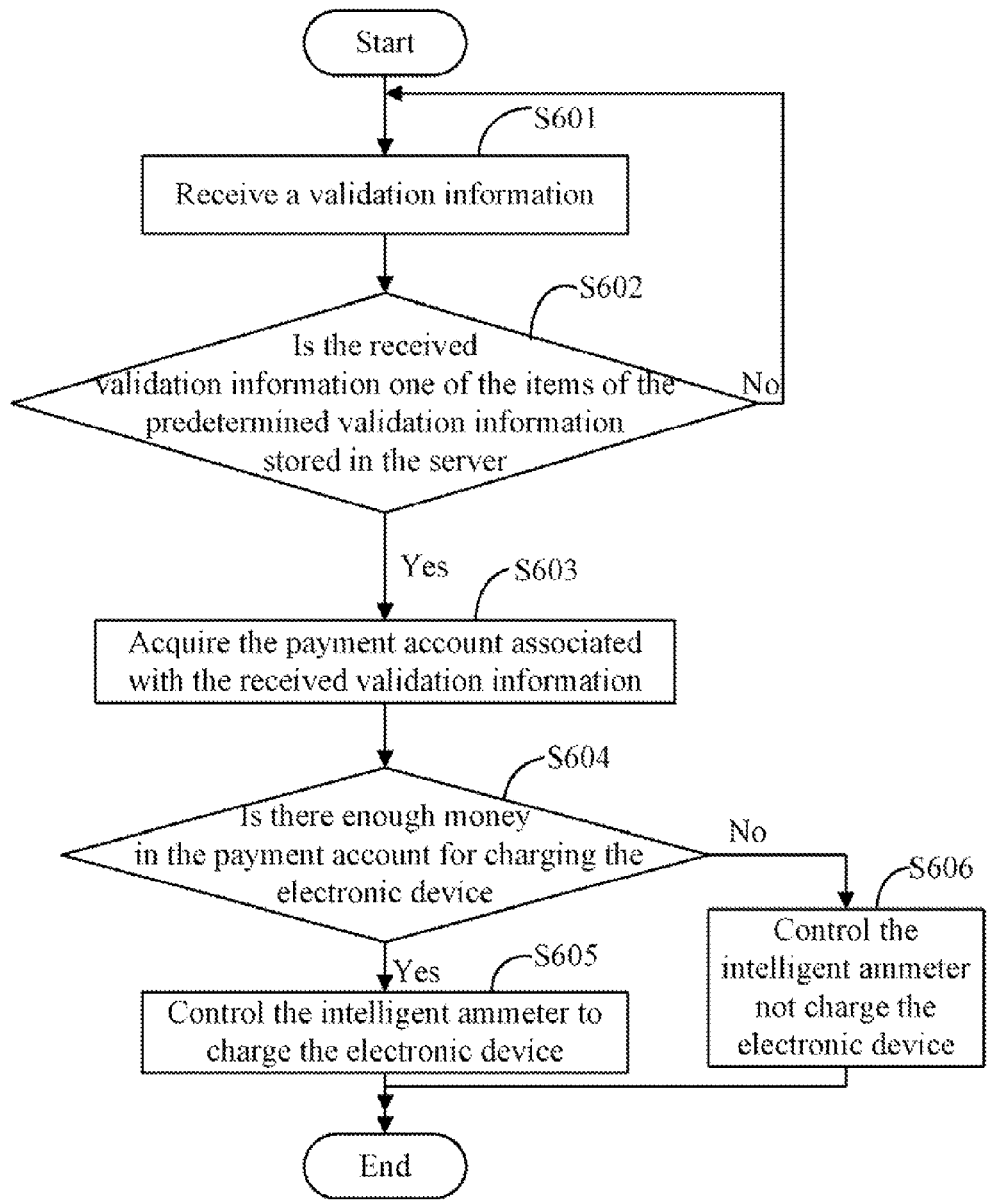
FIG. 3 is a flowchart of a charge control method implemented by the charge control system of FIG. 2, in accordance with an exemplary embodiment.

FIG. 3 is a flowchart of a charge control method implemented by the charge control system of FIG. 2, in accordance with an exemplary embodiment.

In step S601, the receiving module 11 receives the validation information of the electronic device from the user.

In step S602, the validating module 12 determines whether any received validation information matches one of the items of predetermined validation information stored in the storage unit 20. If there is a match, the procedure goes to step S603, if there is no match, the procedure goes to step S601.

In step S603, the information acquiring module 14 acquires the payment account associated with a particular item of validation information.

In step S604, the information acquiring module 14 detects whether there is enough money in the payment account for charging the electronic device 1, if there is, the procedure goes to step S605, if there is not, the procedure goes to step S606.

In step S605, the charge control module 13 controls the intelligent ammeter 2 to begin charging the electronic device 1.

In step S606, the charge control module 13 controls the intelligent ammeter 2 to withhold power and not recharge the electronic device 1.

The method further includes the following steps: the recording module 15 records the total amount of electrical power (charging value) supplied by the intelligent ammeter 2 to the electronic device 1, the receiving module 11 receives a charging completed instruction after a period of time, the charge control module 13 controls the intelligent ammeter 2 to stop charging the electronic device 1 in response to the charging completed instruction, and the deducting module 16 calculates a payment charge according to the charging value, and deducts the calculated payment charge from the payment account.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. A charge control system comprising:
    a storage unit configured to store a plurality of items of predetermined validation information and a plurality of payment accounts, wherein each of the plurality of payment accounts is associated with one of the items of the predetermined validation information; and
    at least one processor;
    a plurality of modules to be executed by the at least one processor, wherein the plurality of modules comprise:
        a receiving module configured to receive a validation information from an electronic device of a user;
        a validating module configured to determine whether the received validation information is one of items of predetermined validation information stored in the storage unit;
        an information acquiring module configured to acquire the payment account associated with the received validation information, and detect whether there is enough money in the payment account for charging the electronic device when the received validation information matches the one of the items of the predetermined validation information associated with the payment account;
        a charge control module configured to control an intelligent ammeter to charge the electronic device when there is enough money in the payment account;
        a recording module configured to record a charging value provided by the intelligent ammeter to the electronic device during a charging procedure;
        a deducting module configured to receive a charging completed instruction; and
        the charge control module being further configured to stop charging the electronic device in response to the received charging completed instruction.

2. The charge control system as described in claim 1, wherein the deducting module is configured to calculate a payment charge according to the charging value, and deduct the calculated payment charge from the payment account after the intelligent ammeter stops charging for the electronic device.

3. A charge control method comprising:
    providing a storage unit for storing a plurality of items of validation information and a plurality of payment accounts, wherein each of the plurality of payment accounts is associated with one of the items of the predetermined validation information; and
    providing at least one processor to implement following steps:
        receiving a validation information from an electronic device of a user;
        determining whether the received validation information is one of items of predetermined validation information stored in the storage unit;
        acquiring the payment account associated with the received validation information, and detecting whether there is enough money in the payment account for charging the electronic device when the received validation information matches the one of the items of the predetermined validation information associated with the payment account;
        controlling an intelligent ammeter to charge the electronic device when there is enough money in the payment account;
        recording a charging value of the electronic device provided by the intelligent ammeter to the electronic device during a charging procedure;
        receiving a charging completed instruction; and
        stopping charging the electronic device in response to the received charging completed instruction.

4. The charge control method as described in claim 3, further comprising:
    calculating a payment charge according to the charging value, and deducting the calculated payment charge from the payment account after the intelligent ammeter stops charging for the electronic device.

* * * * *